United States Patent [19]
Choi

[11] Patent Number: 5,544,420
[45] Date of Patent: Aug. 13, 1996

[54] COMBINATION TAPE MEASURE AND LIGHT BULB

[76] Inventor: Young J. Choi, 168 Manito Ave., Oakland, N.J. 07436

[21] Appl. No.: 388,363

[22] Filed: Feb. 14, 1995

[51] Int. Cl.⁶ .................. G01B 3/10; G01D 11/28
[52] U.S. Cl. .................. 33/760; 33/770; 33/771; 362/120
[58] Field of Search .................. 33/756, 758, 759, 33/760, 768, 770, 771, 767, 293, 295, 392, 393, 394; 362/84, 103, 108, 253, 23, 28, 119, 120, 109

[56] References Cited

U.S. PATENT DOCUMENTS

| | | | |
|---|---|---|---|
| 1,982,304 | 11/1934 | Holden | 33/756 |
| 2,354,853 | 8/1944 | Dobbs | 33/760 |
| 2,711,044 | 6/1955 | Woods | 362/120 |
| 2,992,487 | 7/1961 | Miller | 33/760 |
| 2,994,958 | 8/1961 | Beeber | 33/771 |
| 3,100,937 | 8/1963 | Burch | 33/770 |
| 3,121,957 | 2/1964 | Brown | 33/771 |
| 3,136,067 | 6/1964 | Horner | 33/771 |
| 4,462,160 | 7/1984 | Cohen et al. | 33/760 |
| 4,777,758 | 10/1988 | Phillips | 43/42.09 |
| 4,946,010 | 8/1990 | DiBono | 192/12.2 R |
| 5,381,318 | 1/1995 | Fang | 33/770 |

FOREIGN PATENT DOCUMENTS

| | | | |
|---|---|---|---|
| 21001 | 2/1981 | Japan | 33/760 |
| 4089501 | 3/1992 | Japan | 33/771 |
| 2229533 | 9/1990 | United Kingdom | 33/760 |

*Primary Examiner*—Thomas B. Will
*Attorney, Agent, or Firm*—W. Patrick Quast, Esq.

[57] ABSTRACT

A combination tape measure and light bulb assembly disclosed. A light bulb assembly is affixed to the free end of a semi rigid tape measure. A strip of electrically conductive material is applied to the bottom of the tape measure, with various electrical switching mechanisms described to connect this strip of material to a source of electric current, and thereby light the bulb whenever required by the operator. The light bulb assembly includes a reflector plate for increasing illumination coming from the bulb, and a clear plastic shield for the bulb. The light bulb assembly can also include a magnet to further add to the utility of the combination.

11 Claims, 3 Drawing Sheets

COMBINATION TAPE MEASURE AND LIGHT BULB

BACKGROUND

This invention relates to tape measures, and in particular to a tape measure modified to have a light bulb affixed to the beginning portion of the tape measure.

A variety of tape measures are, of course, in use for conveniently measuring distances between two points for virtually a limitless number of home and commercial applications. The tape measure can be, in its simplest form, a length of fabric having measuring demarcations printed along its length to denote inches, feet, etc. Another common version of the tape measure to which this invention is primarily addressed is the tape measure in the form of a semi rigid length of plastic or metal wound about a spring loaded spool. In this version, the tape measure usually extends outwardly from a metal or plastic encasement for the spool when the beginning end of the tape measure is manually pulled away from the spool by an operator. The tape measure may be designed to maintain a given length, and then retract onto the spool when a release button on the encasement is pushed in. Or a knob can be provided on the encasement to lock a tape measure at a given length according to the operator's intention, and then the knob locking mechanism can be released at the discretion of the operator to cause the tape measure to re-wind onto the spring loaded spool. Other methods for extracting and retracting the tape measure, including electrically operated tape locking and release mechanisms, can be employed.

In the instant invention the utility of these useful devices is further increased. By affixing a light bulb to the beginning end portion of the tape, the tape measure can now be employed to illuminate many heretofore difficult to light locations. For example, illumination might be required for an overhead area, behind or under furniture, within a tube, and so on. In addition, this beginning end portion of the tape measure can be further modified by having a magnet attached thereto. In this manner magnetically attracted objects that are temporarily lost, can be more easily located and magnetically retrieved.

It is therefore a primary object of the invention to provide a combination tape measure and light bulb.

A further object of the invention is to have the light bulb portion of the combination removably attached to the tape measure.

An additional object of the invention is to have the light bulb of the combination operator activated.

Still another object of the invention is to have the light bulb of the combination protected by a shield.

Another object of the invention is to have the light emitted from the light bulb of the combination amplified.

Another object of the invention is to have the tape measure-light bulb combination include a battery for energizing the light bulb.

A further object of the invention is to attach a magnet to the beginning end portion of the tape measure in combination with said light bulb.

SUMMARY

These and other objects are accomplished in the instant invention of a combination tape measure and light bulb.

It has been found that the standard spring wound spool tape measure can be modified to have a light bulb affixed to the beginning end portion of the tape measure. For example, the standard finger hook normally found at this end of the tape measure is removed, and a light bulb is either clamped on, adhesively secured, or soldered or welded (in the case of a metal tape measure) onto this end of the tape measure. The light bulb is preferably affixed to the bottom side of the tape measure, i.e. the side without the measuring demarcations, although there can be applications wherein it would be desirable to have the light bulb affixed to the top side of the tape measure. With the light bulb in place, the bulb now performs a similar function to the standard finger hook previously mentioned.

To provide electric current to the bulb a strip of electrically conducting material, such as aluminum or copper, is attached along the full length of the bottom of the tape measure, with the light bulb being in electrical contact with this strip of material. Electrical contact between this strip of electrically conducting material and a source of electricity, such as standard household A.C. current or to one or more batteries, can be accomplished in a variety of convenient ways. For example, depressing the knob on the tape lock described above can cause the electrically conductive strip of material to come in contact with one end of an electrically conductive wire connected to the positive terminal of a battery. In the case of an electrically conductive tape measure and electrically conductive spool encasement, current can return to the negative terminal of the battery through the tape measure and encasement to an electrically conductive wire attached between the encasement and the negative terminal of the battery.

Alternatively, in the case of an all plastic spool and encasement fabrication, the spool can be equipped with a pair of electrically conductive slip rings on either side of the spool, said slip rings being electrically connected to a battery. In this case an electrical connection, e.g. copper wire, is provided between the strip of electrically conductive material at that portion of the tape measure that forms the connection to the spool, and one of the two slip rings. In the case of an electrically conductive tape measure, return current then flows through the tape measure and to a second electrical connection, such as a second copper wire, to the other slip ring, and thence to the negative terminal of a battery.

The light bulb itself can be turned on and off at user discretion in a variety of ways depending on the mode of action of the electrical connections employed. The operator can simply manually press the tape measure against an electrical contact in the spool encasement, or more conveniently the tape measure-light bulb combination can be configured so that locking the tape measure at any selected length completes the electric circuit and caused the light bulb to be lighted. In the case of batteries being utilized as the source of electricity, this can be, for example, two AA size batteries accessibly packed so as to be part of the spool encasement, or a convenient battery pack can be affixed to the external surface of the spool encasement by screws, adhesives, magnetically, etc.

The light bulb itself can be made a permanent part of the tape measure, but more conveniently it can be made part of a snap on assembly for attachment to the beginning end portion of the tape measure.

To further add to the utility of the tape measure-light bulb combination of the invention, a magnet can be added to the light bulb assembly. In this case the convenience of being able to illuminate previously difficult to light areas now has the added function of magnetically retrieving lost objects located by this unique combination.

DETAILED DESCRIPTION

Figure 1:
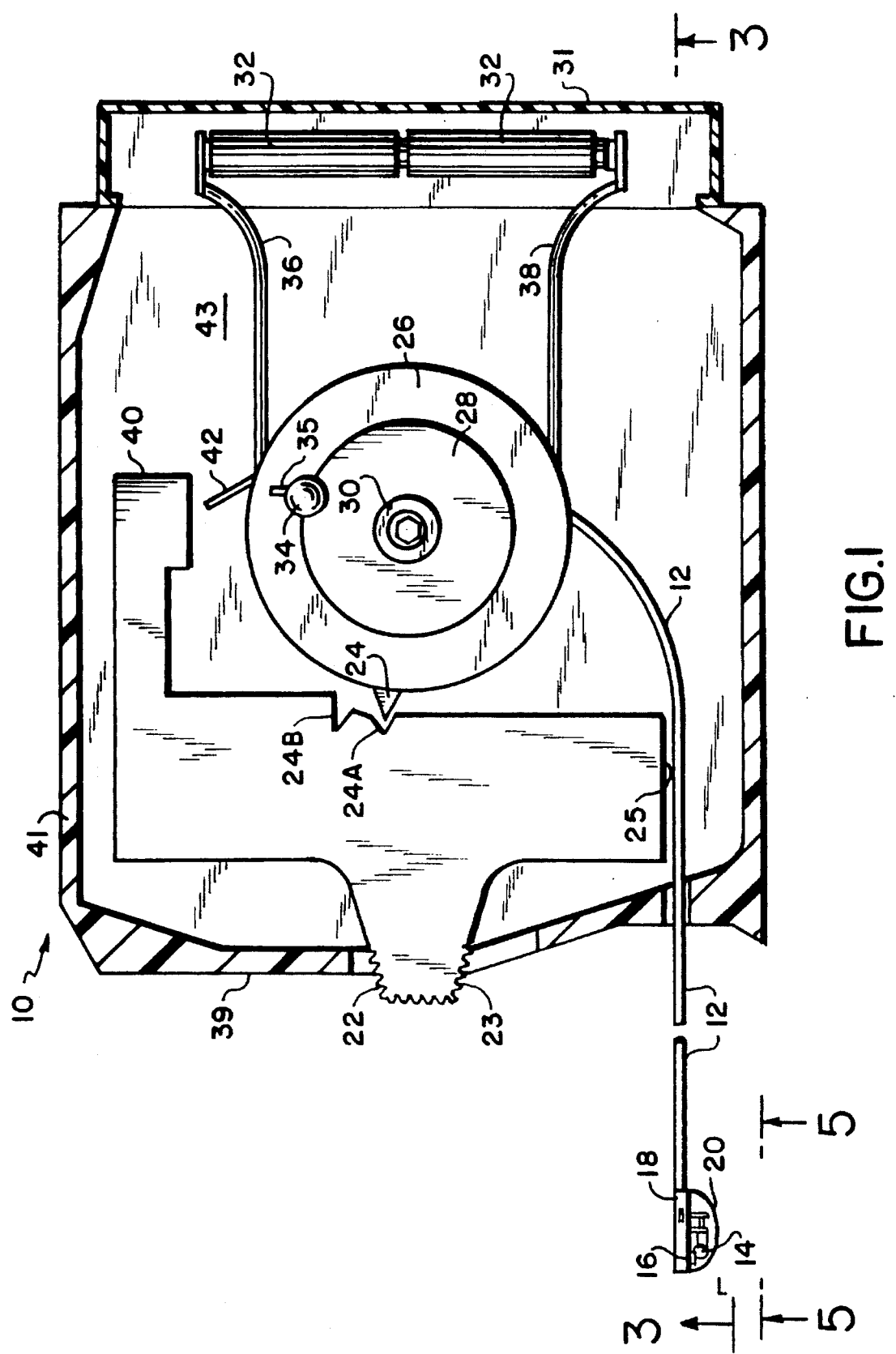
FIG. 1 is a perspective, sectional view of one version of the combination tape measure-light bulb combination of the invention.

Turning now to the drawings wherein like structures having like functions are denoted with the same numerals, in FIG. 1 a complete version of the tape measure-light bulb combination 10 of the invention is depicted. Two sides 41, 43 of an encasement 39 for containing the spool 54 (FIG. 3) is shown, partially cut away to show the interior of the combination 10. A tape measure 12 is shown having a light bulb 14 and magnet 16 affixed to the beginning end portion of the tape measure by means of a snap on light bulb-magnet assembly 18. The other end of the tape measure 12 is connected to a spool 54 within the encasement 39. Attached to the encasement is a battery pack 31 shown partially cut-away to reveal two AA size batteries 32 typically connected in series within a battery pack. The left side 26 of the spool 54 has a copper slip ring 28, an electrical brush 34, and at its center the spring loaded mechanism 30 of the spool. A first electrical wire 36 connects the positive terminal of a first one of the two batteries to a switch 42 (FIG. 3) immediately adjacent to this brush 34, while a second electric wire 38 connects the negative terminal of the second one of the two batteries to a second brush 50 (FIG. 3) connected to the copper slip ring 62 on the right hand side 52 of the spool. This version of a tape measure has a typical tape lock 22 to hold the tape in an extended position along any portion of its length at the discretion of the operator. Normally tape measures operate on a similar principal to the one described, as for example, when the tape lock 22 is pressed downward it moves the lock over the detente 24 on the spool from an initial locking position 24A to a second locking position 24B, with the base 25 of the lock within the encasement 39 now contacting and frictionally holding the tape measure. The tape lock 22 is shown modified to have a switch closing arm 40 so positioned so as to close electrical switch 42 onto electric wire 35 (FIG. 3) when the tape lock is pushed into down and tape locking position.

Figure 3:
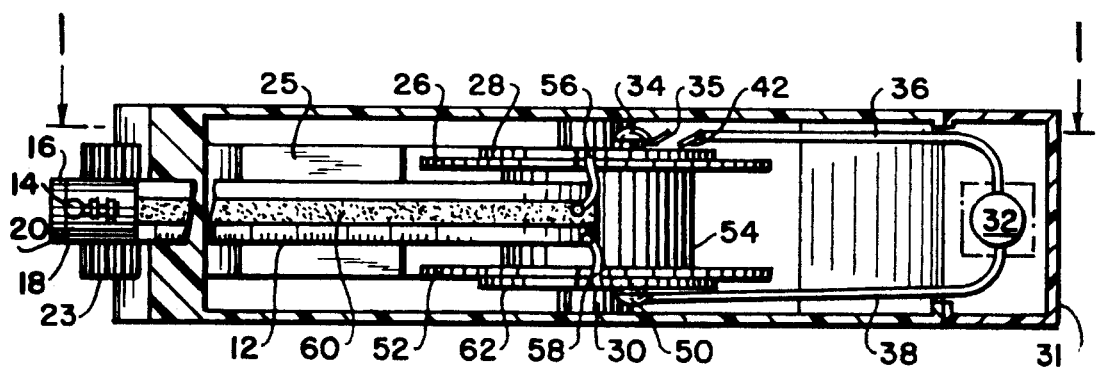
FIG. 3 is a schematic view from the base of the version of the invention depicted in FIG. 1.
Figure 5:
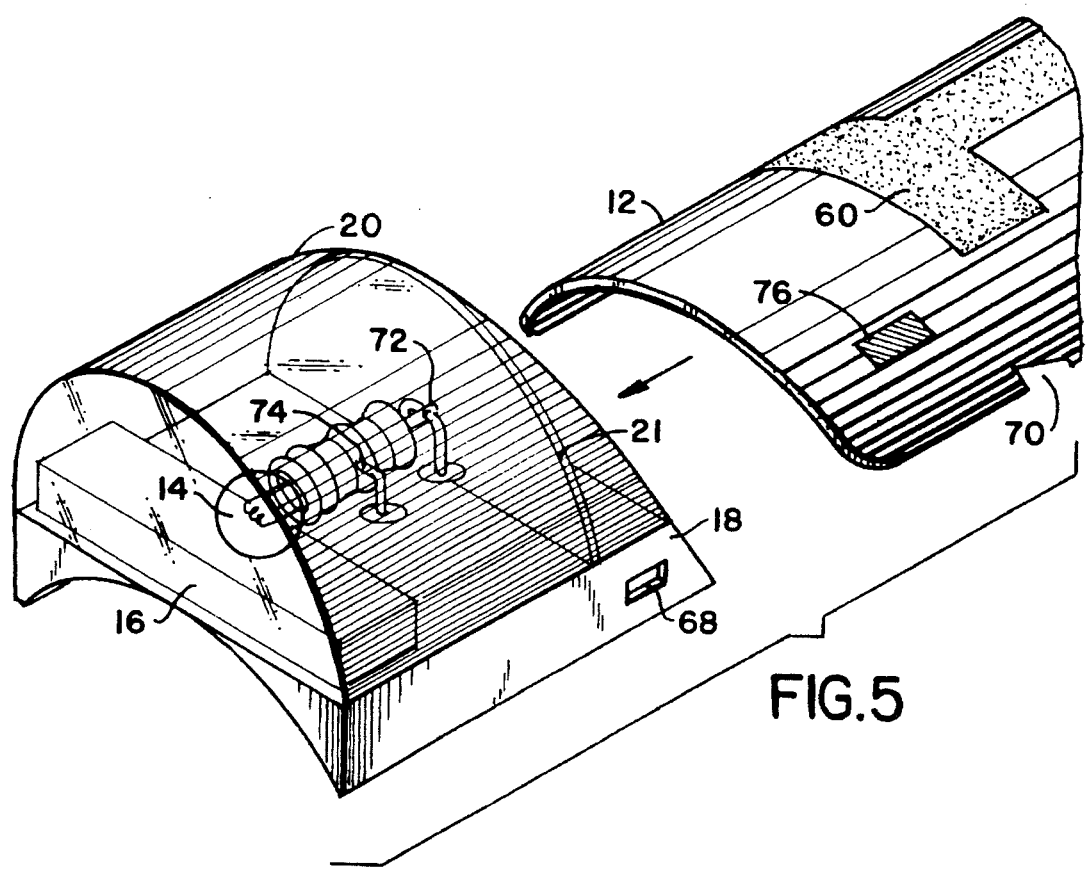
FIG. 5 is a partially exploded view of the light bulb magnet combination snap on assembly of one version of the invention, taken along the lines 5—5 of FIG. 1.

The electrical connections of FIG. 1 are more clearly understood with further reference to FIGS. 3 and 5. FIG. 3 clearly illustrates the strip of electrically conductive material 60 that has been applied along the full length of the bottom of the tape measure 12. This strip is preferably copper, but can be aluminum. The electrically conductive strip of material 60 can be affixed to the bottom of the tape measure in virtually any conventional manner, the important thing being that in the case of an electrically conductive (metal) tape measure there be an electrically insulating layer between the tape measure and the strip of material 60 so as to avoid an electrical short.

As depicted in FIG. 5, the light bulb-magnet assembly 18, together with the clear plastic light bulb guard 20 and light reflector plate 21, snap fits over the tape measure 12, with the detente 70 at the side of the tape measure snapping into the opening 68 at the side of the light bulb-magnet assembly, so that the electrical connection 72 at the bottom of the base of the bulb makes direct contact with the copper strip 60, and the electrical connection 74 at the side of the base of the bulb makes direct contact with a clear, metallic surface 76 at this beginning end portion of the tape measure. Referring now to FIG. 3 the current pathway is shown. When the electrical switch 42 mounted on the left side 26 of the spool 54 is pressed against the electrical wire 35 on the brush on the left hand side of the spool in contact with the left hand side slip ring 28, current is caused to flow from the positive terminal of a first one of the AA batteries 32 in the pack, through an electrical wire 56 (preferably an insulated, multi-strand wire) in contact between the copper strip 60 on the tape measure and the left hand side slip ring 28, the current then going through the electrical contact between the copper strip 60 and the electrical connection at the end of the base portion 72 of the bulb. The bulb is now caused to be lighted, with the return current now going through the electrical connection 74 at the side of the base of the bulb to the clear, metallic contact point 76 on the bottom end portion of the tape measure, the return current going through a second electrical wire 58 (preferably an insulated, multi-strand wire) connection between that portion of the tape measure which is attached to the spool and the slip ring 62 on the right hand side of the spool. An electrical brush 50 in contact with this right hand side slip ring now permits the completion of the electric circuit back to the negative terminal of a second one of the AA batteries 32 in the pack, via an electrical wire connection between the brush 50 and the battery.

Figure 2:
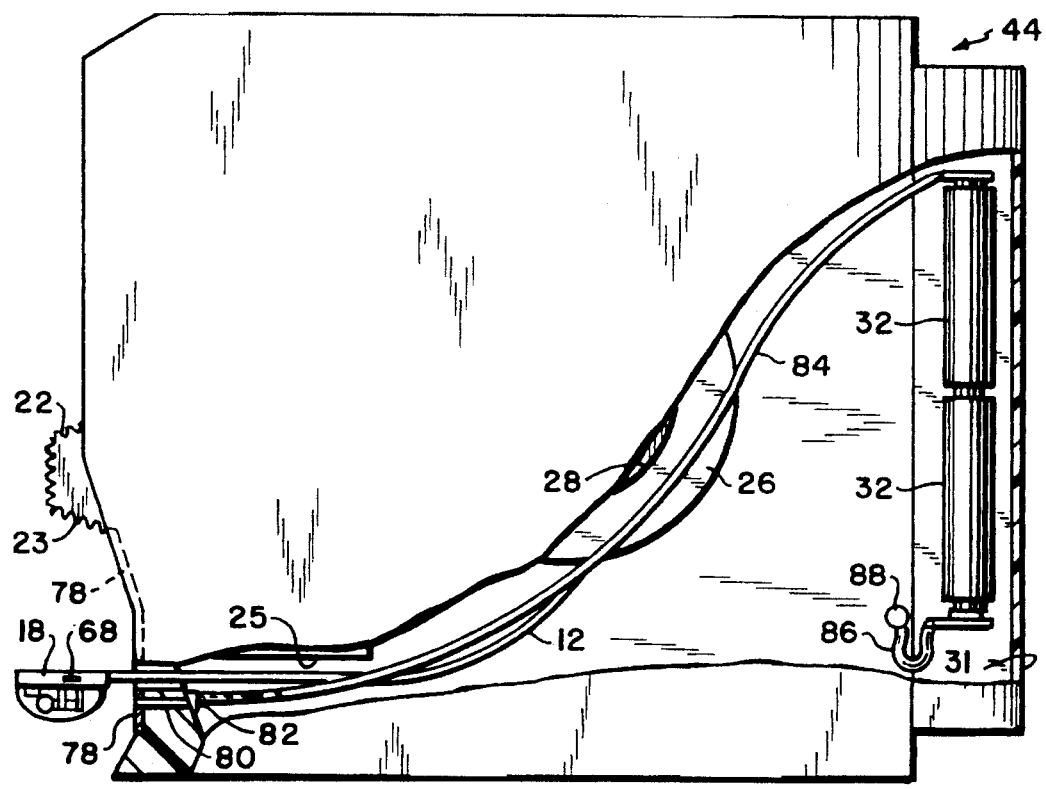
FIG. 2 is a perspective, partially sectional view of one version of the tape measure-light bulb combination of the invention.

The method described above in FIGS. 1 and 3 for supplying current to illuminate the light bulb can, of course, be further simplified by having a direct connection between the battery and the electrically conductive strip 60 on the tape measure. For example, in FIG. 2 a direct electrical connection between the battery(s) and the tape measure is depicted. In this case simply pushing down on the tape lock 22 causes a rod 78 attached to the external base 23 of the tape lock to contact a pivot point on an electrical switch 80 so that this switch 80 moves upwards so as to contact the copper strip 60 on the base of the tape measure. Current now flows through the electric wire 84 connecting the positive terminal of this battery with an electrical contact point 82 on the encasement in contact with the electrical switch 80 beneath the tape measure. In the case of an electrically conductive tape measure and an electrically conductive encasement 44, current returns through the tape measure, through the encasement, and through a wire connection 86 between an electrical contact point 88 on the encasement and the negative terminal of the second of the AA batteries.

Figure 4:
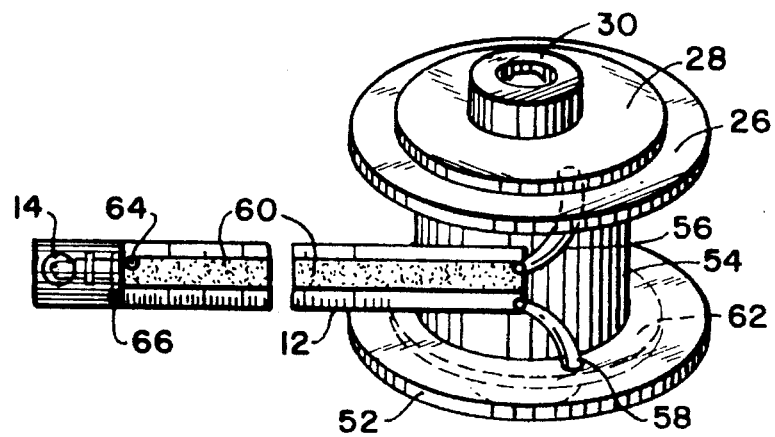
FIG. 4 is a side view of the connection of the tape measure and spool together in one version of the invention.

In FIG. 4, a version of the invention in which the light bulb is permanently affixed to the tape measure 12 is shown. The bulb can be adhesively affixed to the tape measure, affixed with screws to the tape measure, or in the case of a metal tape measure the bulb can be soldered or welded to the bottom of the tape measure. However affixed, an electrical contact 64 at the bottom of the base portion of the bulb is electrically connected to the copper strip 60 on the tape measure, and an electrical contact 66 on the side of the base portion of the bulb is electrically connected to the metal tape measure itself to provide for current return to the battery(s).

The above versions of the invention describe specific constructions for the invention. While a preferred embodiment of the invention would utilize a tape measure sufficiently rigid to be substantially self sustaining along a two foot plane extending outwardly from the encasement, the invention would still provide useful functions for less rigid tape measures. A metallic construction for the tape measure is preferred, but, of course, a variety of methods can be employed for return current conduction, as, for example, including a secondary copper strip on a plastic tape measure, etc. The primary strip of electrically conductive material on the tape measure for carrying current to illuminate the light bulb is preferably copper, but can be aluminum or other electrically conductive material. The illustrated switching mechanisms disclosed for turning the light bulb on and off at operator convenience can be accomplished by a great variety of similar simple electrical switching mechanisms. Further, the light bulb on the invention can be made to blink on and off, making the tape measure-light bulb combination useful as an emergency warning light, as, for example, when placed in an extended position at the rear of a disabled vehicle.

While the present invention has been disclosed in connection with versions shown and described in detail, various modifications and improvements thereon will become readily apparent to those skilled in the art. Accordingly, the spirit and scope of the present invention is to be limited only by the following claims.

What is claimed is:

1. A combination tape measure and light bulb, comprising:

(a) a tape measure having at least a portion of said tape measure being electrically conductive substantially along the full length of said tape measure;

(b) a spool, said tape measure being wound upon said spool, said tape measure being connected to said spool at one end, and free of said spool at its other end, said tape measure fabricated from a sufficiently rigid material such that when it is extended outward from said spool in a substantially straight plane, said tape measure is capable of self sustaining itself, in said plane, for distances up to at least two feet;

(c) a light bulb being affixed to said free end of said tape measure;

(d) an electrically conductive strip of material being secured substantially along a side of said tape measure and the full length of said tape measure;

(e) means for electrically connecting said light bulb between said portion of said tape measure which is electrically conductive and said conductive strip of material; and, (f) means for providing electric current to said strip of material and said portion of said tape measure which is electrically conductive so that said light bulb is lighted when said electric current is provided.

2. The combination tape measure and light bulb according to claim 1 wherein said means for providing electric current to said strip of material further comprises a pair of electrically conductive slip rings, a first one of said pair of slip rings being affixed to the left hand side of said spool, a second one of said pair of slip rings being affixed to the right hand side of said spool, a pair of electrically conductive brushes, a first one of said pair of brushes being in contact with said first slip ring, and a second one of said pair of brushes being in contact with said second slip ring.

3. The combination tape measure and light bulb according to claim 1 wherein said means for providing electric current further comprises at least one battery.

4. The combination tape measure and light bulb according to claim 1 wherein said strip of material is fabricated in a metal selected from the group consisting of aluminum and copper.

5. The combination tape measure and light bulb according to claim 1 wherein said side of said conductive strip of material which is in direct contact with said tape measure is covered with an electrically insulating layer of material.

6. The combination tape measure and light bulb according to claim 5 wherein said layer of electrically insulating material is a layer of electrically insulating adhesive material.

7. The combination tape measure and light bulb according to claim 1 wherein said light bulb is mounted on a stand, said light bulb stand being separate from said tape measure, said light bulb stand being removably affixed to said free end of said tape measure.

8. The combination tape measure and light bulb according to claim 7 wherein said stand further comprises a reflector plate to reflect light emanating from said light bulb.

9. The combination tape measure and light bulb according to claim 7 wherein said stand further comprises a clear, protective shield for said light bulb.

10. The combination tape measure and light bulb according to claim 1, further comprising a magnet being affixed to said free end of said tape measure.

11. The combination tape measure and light bulb according to claim 7, further comprising a magnet being affixed to said stand for said light bulb.

* * * * *